(12) United States Patent
Lai

(10) Patent No.: US 8,270,840 B2
(45) Date of Patent: Sep. 18, 2012

(54) BACKWARD COMPATIBLE OPTICAL USB DEVICE

(75) Inventor: Jiin Lai, Taipei (TW)

(73) Assignee: VIA Technologies, Inc., New Taipei (TW)

( * ) Notice: Subject to any disclaimer, the term of this patent is extended or adjusted under 35 U.S.C. 154(b) by 350 days.

(21) Appl. No.: 12/818,361

(22) Filed: Jun. 18, 2010

(65) Prior Publication Data

US 2011/0243568 A1    Oct. 6, 2011

Related U.S. Application Data

(60) Provisional application No. 61/321,497, filed on Apr. 6, 2010.

(51) Int. Cl.
H04B 10/02 (2006.01)
H04B 10/04 (2006.01)

(52) U.S. Cl. ......... 398/138; 398/135; 398/182; 398/140

(58) Field of Classification Search .......... 398/135–139, 398/182, 140
See application file for complete search history.

(56) References Cited

U.S. PATENT DOCUMENTS

| 6,950,610 | B2 | 9/2005 | Lee |
| 7,124,307 | B2 | 10/2006 | Sugita et al. |
| 7,126,585 | B2 | 10/2006 | Davis et al. |
| 7,287,703 | B2 | 10/2007 | Son et al. |
| 7,324,757 | B2 | 1/2008 | Wilson et al. |
| 7,376,773 | B2 | 5/2008 | Kim et al. |
| 7,635,280 | B1 | 12/2009 | Crumlin et al. |
| 7,698,490 | B2 | 4/2010 | Terrell, II |
| 2008/0235418 | A1 | 9/2008 | Werthen et al. |
| 2009/0088024 | A1 | 4/2009 | Ling et al. |

(Continued)

FOREIGN PATENT DOCUMENTS

EP    1213658 A2    6/2002

(Continued)

OTHER PUBLICATIONS

M2-100/210/10S/21S (Ver. 2.3) Data Sheet. Opticis. Aug. 3, 2005. Downloaded from http://opticis.com/pdf/Datasheet/Datasheet%20M2%20V2.3.pdf on Apr. 13, 2010. pp. 1-5.

(Continued)

Primary Examiner — Kenneth N Vanderpuye
Assistant Examiner — Daniel Dobson
(74) Attorney, Agent, or Firm — Richard K. Huffman; James W. Huffman

(57) ABSTRACT

An optical USB device includes an electro-optical converter configured to receive optical signals from an optical fiber and to convert them into first electrical signals and configured to receive second electrical signals and to convert them into optical signals for transmission to the optical fiber. A USB 3.0 pin-compatible connector is coupled to the electro-optical converter. The pin-compatible connector is configured for coupling to a USB 3.0 connector of another USB device. The pin-compatible connector includes a first pair of pins configured for transmitting the first electrical signals from the optical USB device. The pin-compatible connector also includes a second pair of pins configured for receiving the second electrical signals into the optical USB device. The pin-compatible connector also includes a third pair of pins configured for transceiving third electrical signals according to a non-USB serial bus interface protocol to control and configure the electro-optical converter.

20 Claims, 5 Drawing Sheets

U.S. PATENT DOCUMENTS

| | | | |
|---|---|---|---|
| 2009/0196621 A1* | 8/2009 | Chen | 398/115 |
| 2009/0248924 A1 | 10/2009 | Melin | |
| 2010/0095110 A1* | 4/2010 | Noble et al. | 713/153 |
| 2010/0109795 A1 | 5/2010 | Jones et al. | |
| 2010/0169511 A1 | 7/2010 | Dunstan et al. | |
| 2010/0185796 A1 | 7/2010 | Schneider et al. | |
| 2010/0315920 A1 | 12/2010 | Hua et al. | |
| 2011/0087806 A1 | 4/2011 | Mohanty et al. | |
| 2011/0150487 A1* | 6/2011 | Walter | 398/115 |
| 2011/0208980 A1 | 8/2011 | Brooks et al. | |
| 2011/0211036 A1 | 9/2011 | Tran | |
| 2012/0141132 A1* | 6/2012 | Walker | 398/116 |

FOREIGN PATENT DOCUMENTS

| | | |
|---|---|---|
| WO | WO2009118582 A1 | 10/2009 |
| WO | WO2011034544 A1 | 3/2011 |

OTHER PUBLICATIONS

Shankland, Stephen. "USB 3.0 brings Optical Connection in 2008." CNET news. Sep. 18, 2007. pp. 1-2 Downloaded from http://news.cnet.com/8301-17938_105-9780794-1.html. on Apr. 13, 2010.

* cited by examiner

BACKWARD COMPATIBLE OPTICAL USB DEVICE

CROSS REFERENCE TO RELATED APPLICATION(S)

This application claims priority based on U.S. Provisional Application Ser. No. 61/321,497, filed Apr. 6, 2010, entitled BACKWARD COMPATIBLE SOLUTIONS FOR OPTICAL USB DEVICES, which is hereby incorporated by reference in its entirety.

FIELD OF THE INVENTION

This invention relates in general to the field of Universal Serial Bus (USB), and more particularly to backward compatible solutions for a USB host controller to recognize a USB 3.0 optical device and responsively perform subsequent operations.

BACKGROUND OF THE INVENTION

The Universal Serial Bus (USB) Specification was developed many years ago to facilitate connectivity between electronic devices. The bandwidth is improved from USB1.1 at 1.2 Mb/sec, 12 Mb/sec to USB2.0 at 480 Mb/sec and recently to USB3.0 at 5 Gb/sec. One of the reasons for the success of the USB interface is its backward compatibility from USB1.1/USB2.0 to the recent USB3.0. The user can plug in any USB device, no matter whether it is a USB1.1, USB2.0 or USB3.0 device, into the USB backward-compatible connector, and the system (or so-called host) will recognize the inserted USB device. More specifically, the USB 3.0 architecture, specified in the USB 3.0 Specification, Revision 1.0, Nov. 12, 2008, managed and disseminated by the USB Implementers Forum, Inc., includes highly desirable features over previous USB architectures, including the SuperSpeed (SS) protocol.

However, there are practical limits for the electrical cables (copper cables) used in USB1.1, USB2.0 or USB3.0 technology, such as speed and length due to electro-magnetic interference (EMI) and other issues. However, optical technology, which is used extensively in data centers and telecommunications, does not have these limitations since it transmits data using light instead of electricity and is promoted for the next generation of USB Specification. That is, the electrical cable is replaced with an optical cable so that the transfer speed is upgraded to 10 Gb/sec or even up to 100 Gb/sec in the next decade and beyond. When USB technology advances to an optical solution (USB next generation), there will be a backward compatibility issue due to the fact that most electrical devices integrated with USB connectors presently support electrical signal transmission rather than optical signal transmission.

Consequently, the inventor has observed that it is highly desirable to provide solutions to offer compatibility among different speeds of USB devices from USB1.1 at 1.2 Mb/sec, 12 Mb/sec, USB2.0 at 480 Mb/sec, or USB3.0 at 5 Gb/sec, to optical USB at 10 Gb/sec or higher.

BRIEF SUMMARY OF INVENTION

In one aspect the present invention provides an optical universal serial bus (USB) device. The optical USB device includes an electro-optical converter configured to receive optical signals from an optical fiber and to convert the first optical signals into first electrical signals and configured to receive second electrical signals and to convert the second electrical signals into optical signals for transmission to the optical fiber. The optical USB device also includes a USB 3.0 pin-compatible connector, coupled to the electro-optical converter. The USB 3.0 pin-compatible connector is configured for coupling to a USB 3.0 connector of another USB device. The USB 3.0 pin-compatible connector includes a first pair of pins configured for transmitting the first electrical signals from the optical USB device. The USB 3.0 pin-compatible connector also includes a second pair of pins configured for receiving the second electrical signals into the optical USB device. The USB 3.0 pin-compatible connector also includes a third pair of pins configured for transceiving third electrical signals according to a non-USB serial bus interface protocol to control and configure the electro-optical converter.

In another aspect, the present invention provides a method for operating an optical universal serial bus (USB) device. The method includes receiving optical signals from an optical fiber and converting the first optical signals into first electrical signals. The method also includes receiving second electrical signals and to converting the second electrical signals into optical signals for transmission to the optical fiber. The method also includes transmitting the first electrical signals to another USB device on a first pair of pins of a USB 3.0 pin-compatible connector of the optical USB device. The USB 3.0 pin-compatible connector is configured for coupling to a USB 3.0 connector of the other USB device. The method also includes receiving the second electrical signals from the other USB device on a second pair of pins of the USB 3.0 pin-compatible connector. The method also includes transceiving third electrical signals according to a non-USB serial bus interface protocol to control and configure the optical USB device on a third pair of pins of the USB 3.0 pin-compatible connector.

In yet another aspect, the present invention provides a computer program product encoded in at least one computer readable medium for use with a computing device, the computer program product comprising computer readable program code embodied in said medium for specifying an optical universal serial bus (USB) device. The computer readable program code includes first program code for specifying an electro-optical converter, configured to receive optical signals from an optical fiber and to convert the first optical signals into first electrical signals, and configured to receive second electrical signals and to convert the second electrical signals into optical signals for transmission to the optical fiber. The computer readable program code also includes second program code for specifying a USB 3.0 pin-compatible connector, coupled to the electro-optical converter, wherein the USB 3.0 pin-compatible connector is configured for coupling to a USB 3.0 connector of another USB device. The USB 3.0 pin-compatible connector includes a first pair of pins configured for transmitting the first electrical signals from the optical USB device, a second pair of pins configured for receiving the second electrical signals into the optical USB device, and a third pair of pins configured for transceiving third electrical signals according to a non-USB serial bus interface protocol to control and configure the electro-optical converter.

BRIEF DESCRIPTION OF THE DRAWINGS

FIG. 1b is a block diagram illustrating in more detail the optical USB device of FIG. 1a.

DETAILED DESCRIPTION OF THE INVENTION

With current advances in technology, the design of featured functions, specialized integrated circuits and programmable logic generally do not require the rendering of fully detailed implementations or circuit diagrams. The definitions of specified featured functions, electronic functionality, even electrical waveforms, allow modern design techniques to design the desired protocols, logic, and circuits. Accordingly, portions of the present invention will be described primarily in terms of functionality to be implemented. Those of ordinary skill in the art, once given the following descriptions of the functions to be carried out by the present invention, will be able to implement the necessary structure and mechanism in suitable technologies.

Figure 1A:
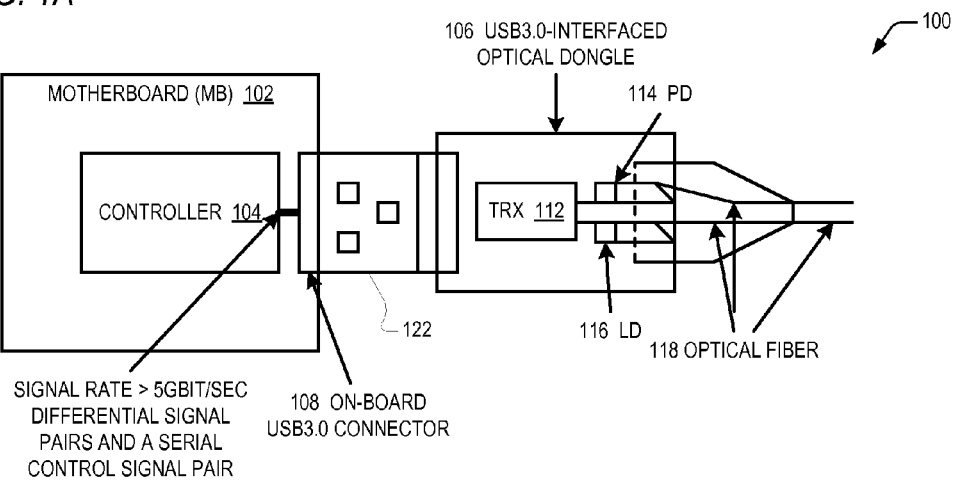
FIG. 1a is a block diagram illustrating a computing system according to the present invention.

Referring now to FIG. 1a, a block diagram illustrating a computing system 100 according to the present invention is shown. A motherboard 102 with an on-board USB3.0 connector 108 is depicted to couple to a USB3.0-interfaced optical dongle 106, also referred to herein as an optical USB device 106. The on-board USB3.0 connector 108 can be any type of USB3.0 connector defined in the USB3.0 Specification, for example, a USB3.0 Standard-A connector. A controller 104 is disposed on the motherboard 102 for detecting plugged-in USB devices. In particular, the controller 104 is configured to recognize that the optical USB device 106 is plugged-in; additionally, the controller 104 is configured to recognize a plugged-in conventional USB3.0 device 202 (see FIG. 2) for backward compatibility, as further discussed below with respect to FIGS. 2 through 4. In the embodiment, the controller 104 is a USB host controller. It is noted that the controller 104 may be disposed in other locations than a motherboard 102, such as a separate add-on card or an intermediate device, such as a hub, as illustrated in FIG. 5.

A USB3.0-interfaced optical dongle 106 is used in this discussion because it is representative of the type of optical USB3.0 device which converts USB3.0 transmissions between electrical form and optical form according to embodiments described herein. The USB3.0-interfaced optical dongle 106 includes a USB3.0 interface 122 that is pin-to-pin compatible with the motherboard USB3.0 connector 108 and is discussed in more detail below with respect to Table 1. An optical fiber 118 may be fixed to the USB3.0-interfaced optical dongle 106 or unplugged from the USB3.0-interfaced optical dongle 106 for easy fiber installation.

In FIG. 1a, an optical transceiver (TRX) 112, a photo-detect diode (PD) 114, and a laser diode (LD) 116 are integrated in the USB3.0-interfaced optical dongle 106 which is external to the motherboard 102. In one embodiment, the photo detect diode 114 is a PIN diode. In one embodiment, the laser diode 116 is a VCSEL (Vertical-Cavity Surface Emitting Laser) diode. The TRX 112, photo-detect diode 114, and laser diode 116 consume power from a VBUS voltage supplied from the motherboard 102.

Figure 1B:
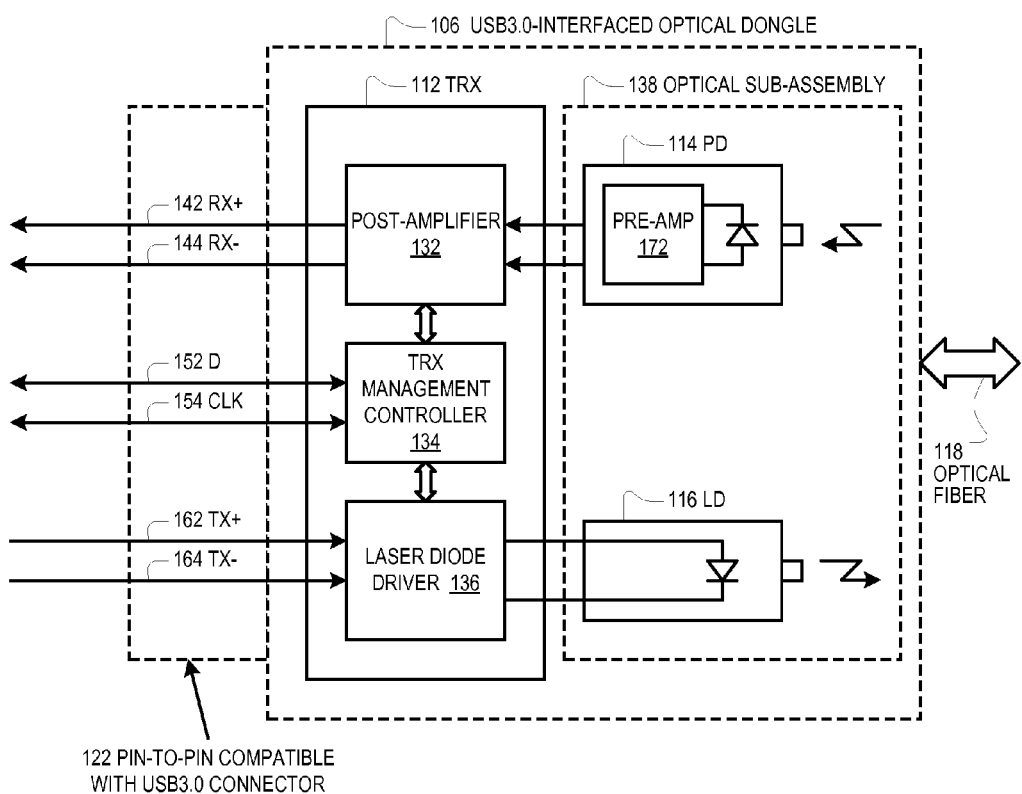

Referring now to FIG. 1b, a block diagram illustrating in more detail the optical USB device 106 of FIG. 1a, including the TRX 112 and optical diodes 114/116 is shown. The USB device 106 includes an optical sub-assembly 138 that includes the photo detect diode 114 and the laser diode 116 of FIG. 1a. In the embodiment of FIG. 1b, the photo detect diode 114 includes a pre-amp 172. The optical sub-assembly 138 is configured for coupling to the optical fiber 118 of FIG. 1a for transceiving optical signals over the optical fiber 118. The optical sub-assembly 138 is also coupled to the TRX 112 for transceiving signals therewith.

The TRX 112 transceives signals in electrical form via the pin-compatible USB3.0 connector 122 of FIG. 1a. The photo-detect diode 114 of the optical sub-assembly 138 is coupled to the TRX 112 for converting signals from optical form to electrical form, and the laser diode 116 is coupled to the TRX 112 for converting signals from electrical form to optical form. In one embodiment, the TRX 112 includes a post-amplifier 132 that receives the electrical signals from the pre-amp 172 of the photo detect diode 114 and transmits them on RX+/RX− 142/144 pins of the connector 122; furthermore, the TRX 112 includes a laser diode driver 136 that receives the electrical signals from TX+/TX− 162/164 pins of the connector 122 and transmits them to the laser diode 116. Importantly, the TRX 112 communicates with the controller 104 disposed on the motherboard 102 through the TX/RX differential signal pairs (RX+/RX− 142/144 and TX+/TX− 162/164) in accordance with the USB3.0 Specification. In one embodiment, the signal rate of the TX/RX differential signal pairs is up to 10 Gb/sec. Since there is no cable between the TRX 112 and the controller 104 when they are coupled together, and the distance between them is extremely short, advantageously the 10 Gb/sec signal rate is feasible in standard CMOS process. Higher signal rates are also contemplated.

To support backward compatibility to the USB3.0 Specification, the USB3.0-interfaced optical dongle 106 connector 122 pin assignment is pin-to-pin compatible with the USB3.0 connector pin definitions, which is described in Table 1 below.

TABLE 1

Connector Pin Assignment

| | Device | | | |
|---|---|---|---|---|
| Pin | USB 3.0 device | | Optical USB device | |
| Number | Signal Name | Description | Signal Name | Description |
| 1 | VBUS | Power | VBUS | Power |
| 2 | D− | USB2.0 | D | D: data, |
| 3 | D+ | differential | CLK | CLK: clock (e.g., SMBUS) |
| 4 | GND | Ground | GND | Ground |
| 5 | SSTX− | SS TX | TX− | TX differential |
| 6 | SSTX+ | differential | TX+ | |
| 7 | GND_DRAIN | Ground | GND_DRAIN | Ground |
| 8 | SSRX− | SS RX | RX− | RX differential |
| 9 | SSRX+ | differential | RX+ | |

As shown in Table 1, the USB3.0 SSTX+/SSTX− and SSRX+/SSRX− pins are referred to as the TX+/TX− 162/164 and RX+/RX− 142/144 pins, respectively, of the USB3.0-interfaced optical dongle 106 connector 122 and are configured to transceive signals in accordance with the USB3.0 Specification. In one embodiment, the signal rate of the TX/RX differential signal pairs is up to 10 Gb/sec.

As shown in Table 1, the USB3.0 D+pin functions as a data (D) pin 152 and the USB3.0 D− pin functions as a clock (CLK) 154 pin. The D 152 and CLK 154 pins, which collectively function as a serial bus 152/154, are coupled to a TRX management controller 134 of the TRX 112 that manages and controls the TRX 112 of the USB3.0-interfaced optical dongle 106. The serial bus 152/154 is configured in accordance with a specified serial bus interface protocol other than the USB2.0 protocol to perform control, configuration, and monitoring functions of the TRX 112 to perform the optical dongle 106 management function. The optical dongle 106's management function includes, but is not limited to, reporting optical link status, temperature, voltage, bias current, temperature compensation of modulation which is commonly used in optical applications to ensure the stability of the optical operation. In one embodiment, the protocol performed on the pins D 152 and CLK 154 comprises a serial management bus protocol having a data signal and a clock signal, e.g., System Management Bus (SMBUS) protocol, or I²C protocol, or the like. Furthermore, the protocol on the pins D 152 and CLK 154 may be configured to indicate control signals or status signals in the TRX 112, e.g., TX_Disable (transmitter is disabled, that is, laser diode 116 driver is disabled), TX_Fault (transmitter fault indication), MOD_ABS (mode select indication), RX_LOS (receiver loss of signal indication), and so forth.

Figure 2:
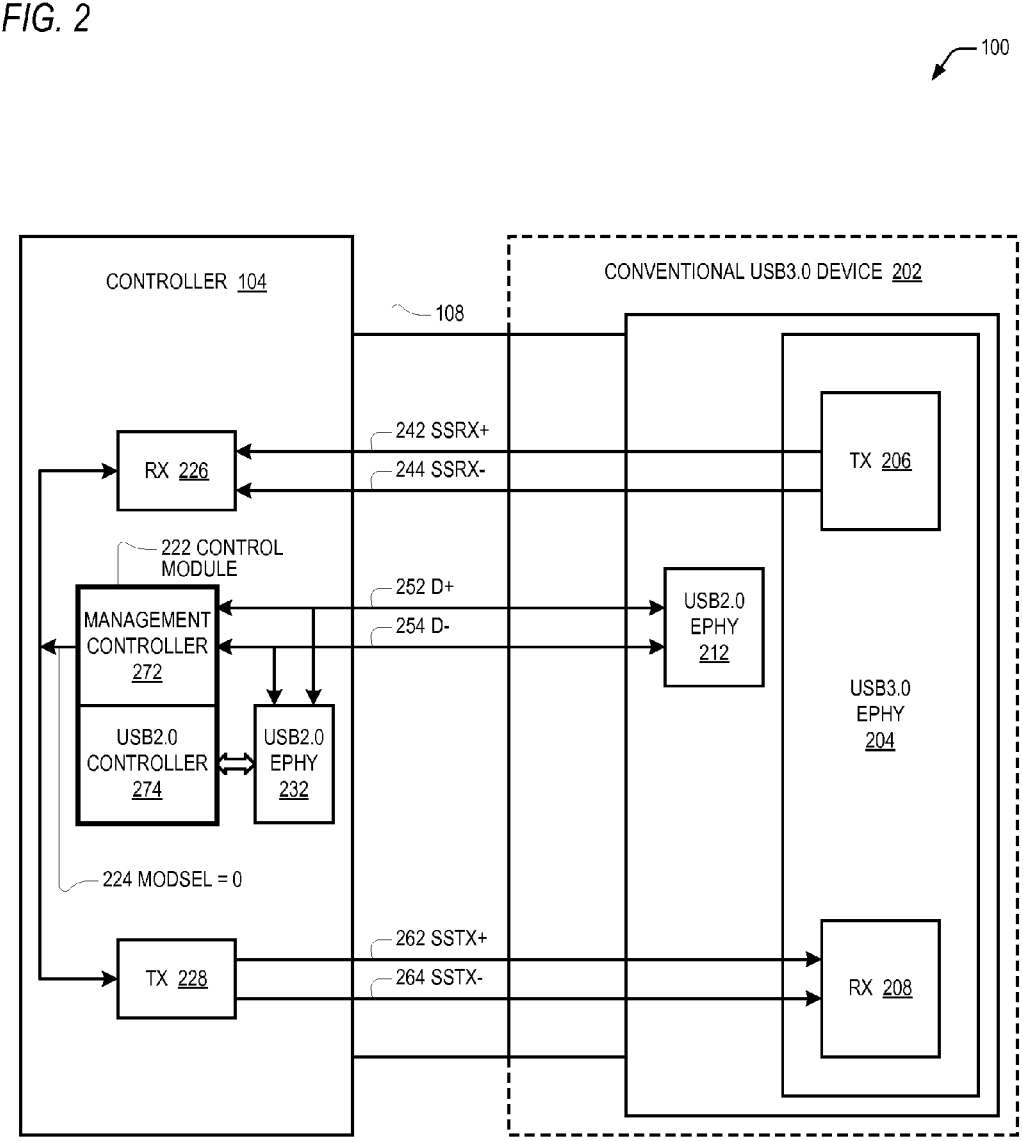
FIG. 2 is a block diagram illustrating a configuration of the system of FIG. 1a in which a conventional USB3.0 device is plugged into a downstream facing port of the controller of FIG. 1a via the motherboard USB3.0 connector of FIG. 1a according to the present invention.

Referring now to FIG. 2, a block diagram illustrating a configuration of the system 100 of FIG. 1a in which a conventional USB3.0 device 202 is plugged into a downstream facing port of the controller 104 of FIG. 1a via the motherboard USB3.0 connector 108 of FIG. 1a according to the present invention is shown. The conventional USB3.0 device 202 includes a USB2.0 EPHY 212 and a USB3.0 EPHY 204. The USB3.0 EPHY 204 includes a transmitter (TX) 206 and a receiver (RX) 208. The USB3.0 EPHY 204 is configured to transceive data at the conventional USB3.0 speed. The USB2.0 EPHY 212 is configured to transceive data at the conventional USB2.0 speed.

Figure 3:
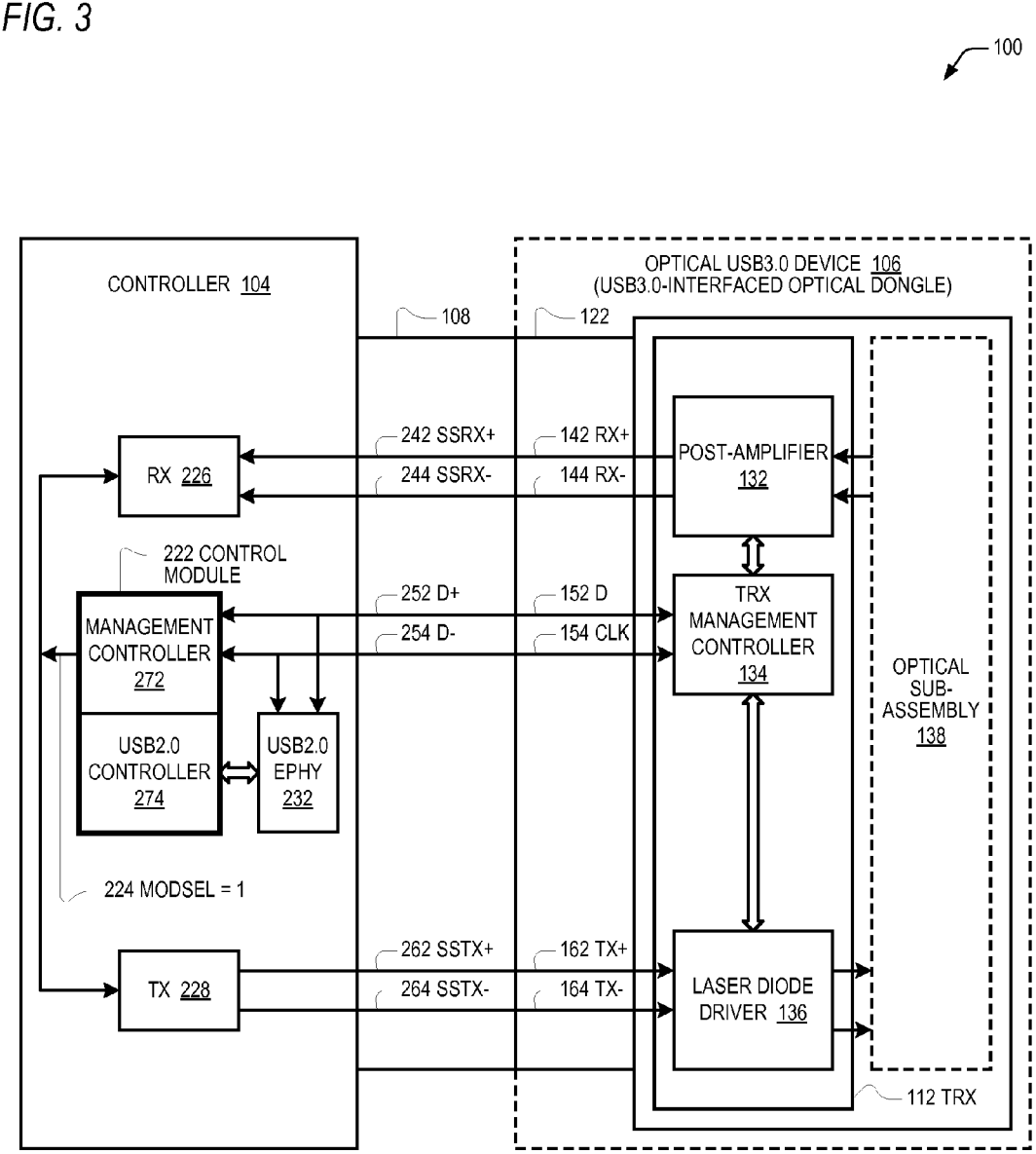
FIG. 3 is a block diagram illustrating a configuration of the system of FIG. 1a in which the USB3.0-interfaced optical dongle of FIG. 1a is plugged into the downstream facing port of the controller of FIG. 1a via the USB3.0 connector of FIG. 1a according to the present invention.

Referring now to FIG. 3, a block diagram illustrating a configuration of the system 100 of FIG. 1a in which the USB3.0-interfaced optical dongle 106 of FIG. 1a is plugged into the downstream facing port of the controller 104 of FIG. 1a via the USB3.0 connector 108 of FIG. 1a according to the present invention is shown. FIG. 3 is a companion with FIG. 2. Taken together, FIGS. 2 and 3 illustrate the ability of the controller 104 to facilitate backward compatibility with conventional USB3.0 devices 202 by dynamically detecting whether a conventional USB3.0 device 202 (of FIG. 2) is plugged into the USB3.0 connector 108 or a USB3.0-interfaced optical dongle 106 (of FIG. 3) is plugged into the USB3.0 connector 108. Furthermore, the controller 104 is alternatively configured to transceive data at the conventional USB3.0 speed (around 5 Gb/sec) or configured to transceive data at a speed above the highest speed (SuperSpeed) specified in USB3.0 Specification (e.g., 10 Gb/sec or higher). It will be described in more detail below. The controller 104 is common to FIGS. 2 and 3 and will now be described.

The controller 104 disposed in the motherboard 102 includes a management controller 272 and a USB2.0 controller 274. In the embodiment, the management controller 272 and the USB2.0 controller 274 are merged into a control module 222. The management controller 272 and the USB2.0 controller 274 each comprise logic, circuits, devices, or program code, or a combination of the above that are employed to perform functions and operations as described herein. The elements employed to perform these functions and operations may be shared with other circuits, program code, etc., that are employed to perform other functions within the collective architecture. The management controller 272 is coupled to process signals and protocols on D+/D− 252/254 pins of the USB3.0 connector 108. In an alternate embodiment, the management controller 272 includes a PHY (such as circuit, logic, etc.) for performing functions, such as an amplifying function, to pre-process the transmission signals. In one embodiment, the management controller 272 is capable of processing signals and protocols on the D+/D− 252/254 pins of the USB3.0 connector 108 whether a conventional USB3.0 device 202 (of FIG. 2) is plugged in or a USB3.0-interfaced optical device 106 (of FIG. 3) is plugged in. Specifically, when a USB3.0-interfaced optical device 106 is plugged, the management controller 272 functions as a serial management controller, such as SMBUS controller or I²C controller, and handles the serial management bus of the pins D152 and CLK 154 of the USB3.0-interfaced optical device 106. In this way, the management controller 272 reads the statuses and other information from the optical USB device 106 to control and configure the optical USB device 106 over the serial management bus. In another aspect, when a conventional USB3.0 device 202 is plugged in, the management controller 272 functions as a transfer control handler, transferring control to the USB2.0 controller 274 to transceive data between the USB2.0 EPHY 212 of the conventional USB3.0 device 202 and a USB2.0 EPHY 232 of the controller 104. The USB3.0 EPHY 204 is configured to transceive data at the conventional USB3.0 speed. The USB2.0 EPHY 212 is configured to transceive data at the conventional USB2.0 speed. The USB2.0 controller 274 is coupled to process signals and protocols on the D+/D− 252/254 pins of the USB3.0 connector 108 via a USB2.0 EPHY 232. In one embodiment, the USB2.0 EPHY 232 is merged in the USB2.0 controller 274. In the embodiment, the management controller 272 and the USB 2.0 controller 274 are separately disposed outside the controller 104.

The controller 104 also includes an EPHY comprising a RX 226 coupled to SSRX+/SSRX− 242/244 pins of the USB3.0 connector 108 and a TX 228 coupled to the SSTX+/SSTX− 262/264 pins of the USB3.0 connector 108. The TX 228 and RX 226 are referred as a transceiver which is configured to transceive signals via SSRX+, SSRX−, SSTX+, and SSTX− pins of the USB 3.0 connector. Advantageously, when the controller 104 determines that a conventional USB3.0 device 202 is plugged into the USB3.0 connector 108, the controller 104 configures the TX/RX 228/226 to transceive at the conventional USB3.0 speed, as shown in FIG. 2. In another embodiment, when the controller 104 determines that a USB3.0-interfaced optical dongle 106 is plugged into the USB3.0 connector 108, the controller 104 configures the TX/RX 228/226 to transceive at a speed above the highest speed specified in USB3.0 Specification.

As mentioned above, the management controller 272 detects the behavior on the D+/D− 252/254 pins and decides if a USB3.0-interfaced optical dongle 106 is plugged in. In one embodiment, described in more detail below with respect to FIG. 4, the management controller 272 detects that a USB3.0-interfaced optical dongle 106 is plugged in by reference to the difference of the D+/D− 252/254 pins.

Referring again to FIG. 2, when a conventional USB3.0 compatible device 202 is plugged in, the management controller 272 issues a negative indication (for example, de-asserts a mode select (Modsel) 224 signal to a logic false value), so that the TX/RX circuits 228/226 of the controller 104 run at a conventional USB3.0 speed (around 5 Gb/sec). In response to the negative indication on the Modsel signal 224, the USB2.0 controller 274 is alerted by the management controller 272 to take control of processing signals and protocols of the D+/D− 252/254 bus with the USB2.0 EPHY 212 of the conventional USB3.0 device 202, as shown in FIG. 2.

Referring again to FIG. 3, when an optical USB device (USB3.0-interfaced optical dongle) 106 is plugged in, the management controller 272 issues a positive indication (for example, asserts the Modsel signal 224 to a logic true value) to indicate to the TX/RX circuits 228/226 to run at another speed (i.e. the higher speed than the USB3.0 SuperSpeed, around 10 Gb/sec speed, but not limited to) if the operation of the optical USB 3.0 device 106 is stable. That is, when the operation of the optical USB 3.0 device 106 is not stable, such as optical link status unstable, the temperature is too high, etc., the TX/RX circuits 228/226 switch back to run at the same speed (around 5 Gb/s) even if the management controller 272 issues a positive indication when an optical USB device (USB3.0-interfaced optical dongle) 106 is plugged in. Other associated functions or logic may also be driven by the positive indication on the Modsel signal 224 for the speed enhancement purpose. Specifically, in response to the positive indication on the Modsel signal 224, the RX 226 is configured to communicate with the post-amplifier 132 of the TRX 112 of the USB3.0-interfaced optical dongle 106 via the signal paths comprising the SSRX+/SSRX− pins 242/244 of the USB3.0 connector 108 and the RX+/RX− pins 142/144 of the optical dongle 106 connector 122, and the TX 228 is configured to communicate with the laser diode driver 136 of the TRX 112 of the USB3.0-interfaced optical dongle 106 via the signal paths comprising the SSTX+/SSTX− pins 262/264 of the USB3.0 connector 108 and the TX+/TX− pins 162/164 of the optical dongle 106 connector 122. In the USB3.0-interfaced optical dongle 106 configuration, the management controller 272, rather than the USB2.0 EPHY 232, directly handles the control of processing signals and protocols over the D+/D− 252/254 (D/CLK 152/154) bus with the TRX management controller 134 of the TRX 112 of the USB3.0-interfaced optical dongle 106.

In one embodiment, when the optical USB device (USB3.0-interfaced optical dongle) 106 is detected, the management controller 272 performs a periodic polling function over the shared serial D+/D− 252/254 (D/CLK 152/154) bus to read the statuses and other information from the optical USB device 106 and to control and configure the optical USB device 106.

Figure 4:
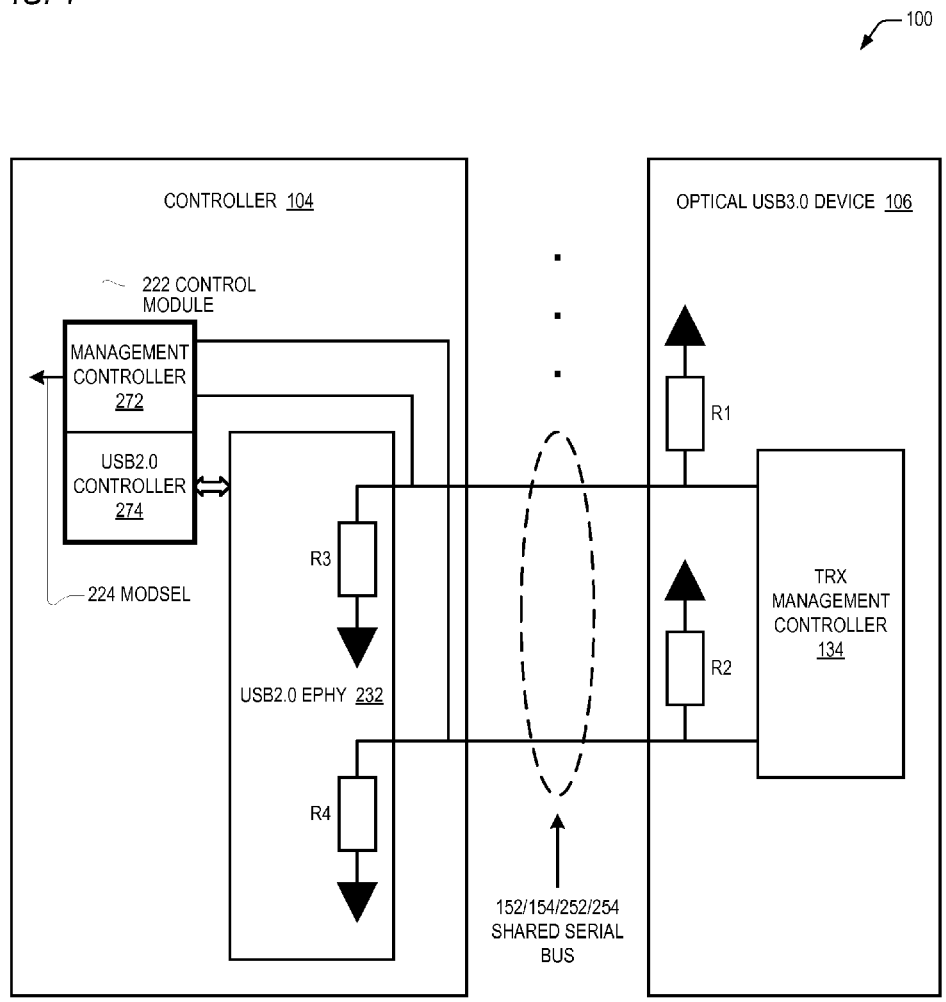
FIG. 4 is a block diagram illustrating an embodiment of the system of FIG. 1a configured for detection of an optical USB device (USB3.0-interfaced optical dongle) plugged into a downstream facing port of the controller of FIG. 1a via the USB3.0 connector of FIG. 1a according to the present invention.
Figure 5:
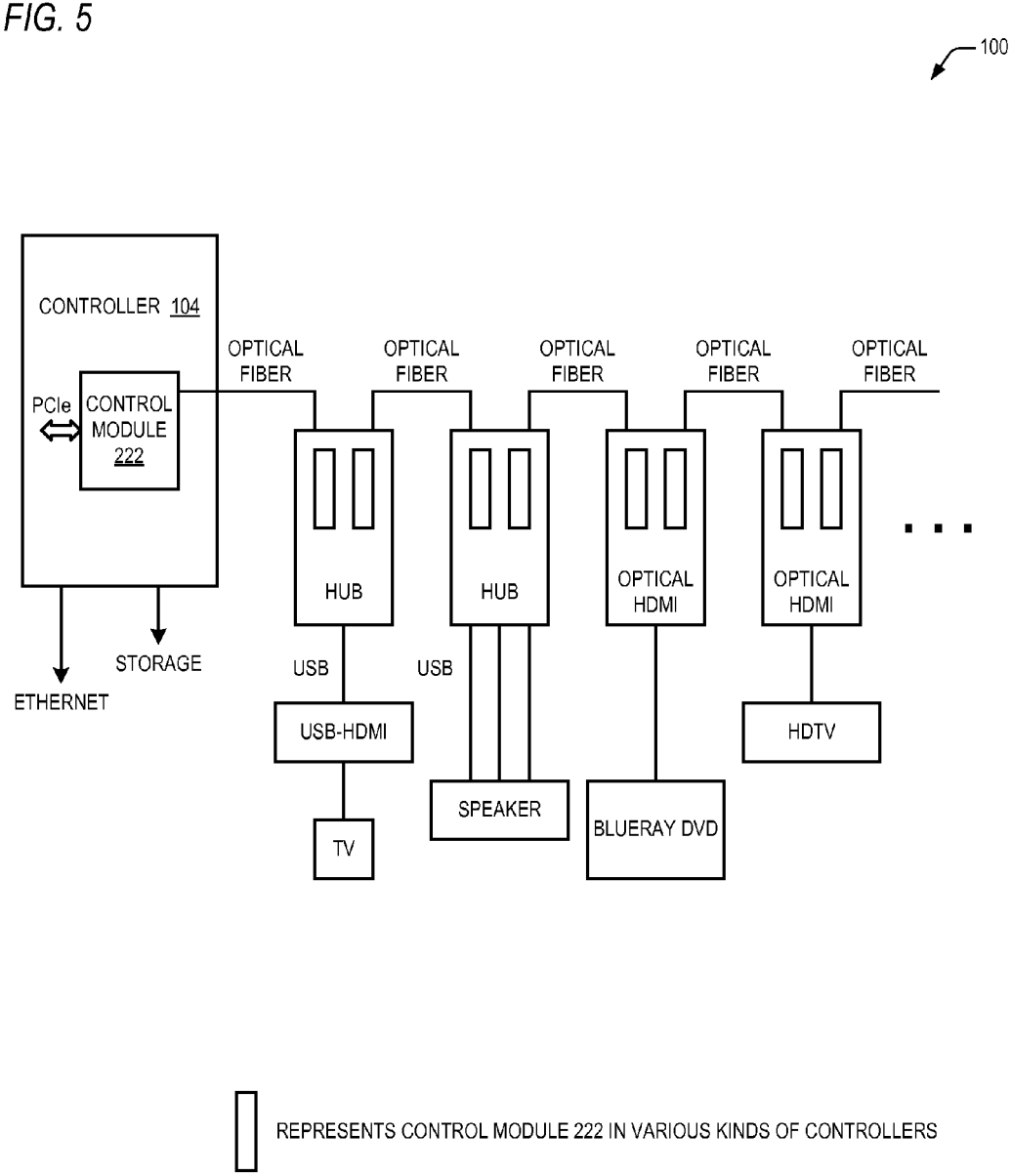
FIG. 5 is a block diagram illustrating one application of the controller and optical USB device of FIGS. 1 through 4 via an integrated optical network.

Referring now to FIG. 4, a block diagram illustrating an embodiment of the system 100 of FIG. 1a configured for detection of an optical USB device (USB3.0-interfaced optical dongle) 106 plugged into a downstream facing port of the controller 104 of FIG. 1a via the USB3.0 connector 108 of FIG. 1a according to the present invention is shown. It only shows the elements that will be discussed later. The USB 2.0 EPHY 232 includes built-in pull-down resistors R3 and R4 on the D+/D− 252/254 (D/CLK 152/154) signals, respectively, as shown in FIG. 4. Additionally, the optical USB device 106 includes two pull-up resistors R1 and R2 on the D/CLK 152/154 (D+/D− 252/254) signals, respectively, as shown in FIG. 4. That is, the two pull-up resistors R1 and R2 are coupled to the specified serial bus interface 152/154 in the optical USB device 106. In one embodiment, the two pull-up resistors R1 and R2 are disposed in an optical transceiver (TRX) management controller 134, or externally added in the optical USB device 106 PCB. The resistor values for the pull-down resistors R3 and R4 and pull-up resistors R1 and R2 is chosen such that when the pull-up resistors R1 and R2 are present, a logic one value is detected at the control module (management controller 272) side. When the optical USB device 106 is plugged in, pull-up resistors R1 (1.5K ohm) and R2 (1.5K ohm) are both coupled to a source voltage (3.3V for example), while pull-low resistors R3 (15K ohm) and R4 (15K ohm) are both coupled to a reference voltage (0V for example). The above values are typical values proposed in the USB3.0 Specification for termination. Thus, in this way there are potential voltages on the D+/D− 252/254 bus. In one embodiment, the USB2.0 connection condition SE1, specified in the USB2.0 Specification, is utilized to present the condition that an optical USB device 106 is present and is coupled to a downstream facing port of the controller 104 of FIG. 1a. In this way, the management controller 272 detects if the following requirements are met. When condition SE1 presents on D+ and D− bus 252/254 for at least a specified time period ($T_{DCNN}$), the optical USB device 106 is successfully recognized and connected. The following requirements and voltages/time parameters are detailed, defined and proposed in the USB2.0 Specification.

1. The source connector (TRX 134) voltage on D+ and D− 252/254 shall be larger than $V_{ose1}$ (Min).
2. The target connector (Controller 104) voltage on D+ and D− 252/254 shall be larger than $V_{IL}$.
3. Condition SE1 presents on the D+ and D− bus 252/254 for at least $T_{DCNN}$.

When the optical USB device 106 is connected, the management controller 272 detects if the above mentioned requirements are met. The management controller 272 asserts the Modsel signal 224 to logic one value to switch the USB3.0 EPHY 226/228 (shown in FIG. 3) to a first mode (10 Gb/s mode for example). In the embodiment, when an optical USB device 106 is plugged in the host side (controller 104 reside), the management controller 272 asserts the Modsel signal 224 to a logic one value to indicate the USB3.0 EPHY 226/228 (shown in FIG. 3) switch to a first mode (run at the higher speed than the USB 3.0 SuperSpeed, around 10 Gb/sec, but not limited to) if the operation of the optical USB 3.0 device 106 is stable. That is to say, when the operation of the optical USB 3.0 device 106 is not stable, such as optical link status unstable, the temperature is too high, etc., the TX/RX circuits 228/226 switch back to a second mode (run at the USB3.0 SuperSpeed, around 5 Gb/s) even if the management controller 272 asserts the Modsel signal 224 to a logic one value when an optical USB device 106 is plugged in. When a conventional USB 3.0 device is plugged in the host side, the management controller 272 de-asserts the Modsel signal 224 to logic zero value to switch the USB3.0 EPHY 226/228 to the second mode (run at the USB 3.0 SuperSpeed, around 5 Gb/s). The skilled artisan can design protocols implemented by hardware, software, or a combination of the two to carry out embodiments for dynamically detecting the presence of the optical USB device 106, which are not limited to the embodiment with the two pull-up terminate resistors R1 and R2 shown in FIG. 4.

Referring now to FIG. 5, a block diagram illustrating one application of the controller 104 and optical USB device 106 of FIGS. 1 through 4 via an integrated optical network is shown. The USB backward-compatible solutions described above may bring significant improvements in simplified connectivity (in home, office, etc.) and a wide range of transmission bandwidth via the integrated optical network environment such as shown in FIG. 5.

Although the embodiments of FIGS. 1 through 5 have been described in detail with respect to backward-compatible solutions including associated detection mechanisms for an optical USB device, embodiments are contemplated in which the invention can be backward compatible with USB2.0 and/or USB1.1.

Although the present invention and its features and advantages have been described in detail, other embodiments are encompassed by the invention as well. For example, embodiments have been presented in terms related to a control module of a controller disposed in a motherboard with a downstream facing port and a USB3.0-interfaced optical dongle (or substantially similar device). It is noted, however, that such examples are used to teach the present invention in a context that is familiar to many of those in the art.

The foregoing description of preferred embodiment of the present invention has been presented for purposes of illustration and description. They are not intended to be exhaustive or to limit the invention to the precise form disclosed, and obviously many modifications and variations are possible in light of the above teaching. It is intended that the scope of the invention be defined by the claims appended hereto and their equivalents.

I claim:

1. An optical universal serial bus (USB) device, comprising:
   an electro-optical converter, configured to receive optical signals from an optical fiber and to convert the first optical signals into first electrical signals, and configured to receive second electrical signals and to convert the second electrical signals into optical signals for transmission to the optical fiber; and
   a USB 3.0 pin-compatible connector, coupled to the electro-optical converter, wherein the USB 3.0 pin-compatible connector is configured for coupling to a USB 3.0 connector of another USB device, the USB 3.0 pin-compatible connector comprising:
      a first pair of pins configured for transmitting the first electrical signals from the optical USB device;
      a second pair of pins configured for receiving the second electrical signals into the optical USB device; and
      a third pair of pins configured for transceiving third electrical signals according to a non-USB serial bus interface protocol to control and configure the electro-optical converter.

2. The optical USB device of claim 1, wherein the electro-optical converter comprises:
   an electrical transceiver, coupled to the USB 3.0 pin-compatible connector; and
   an optical sub-assembly, coupled to the electrical transceiver and to the optical fiber.

3. The optical USB device of claim 2, wherein the electrical transceiver comprises:
   an amplifier, configured to amplify electrical signals received from a photo-detect diode of the optical sub-assembly to generate the first electrical signals; and
   a driver, configured to drive a laser diode of the optical sub-assembly in response to the second electrical signals.

4. The optical USB device of claim 3, wherein the electrical transceiver further comprises:
   a management controller, coupled to the amplifier and driver, configured to control and configure the amplifier and driver in response to the third electrical signals according to the non-USB serial bus interface protocol.

5. The optical USB device of claim 1, wherein the first pair of pins are configured for coupling to the SSRX+ and SSRX− pins of the USB 3.0 connector of the other USB device, wherein the second pair of pins are configured for coupling to the SSTX+ and SSTX− pins of the USB 3.0 connector of the other USB device, wherein the third pair of pins are configured for coupling to the D+ and D− pins of the USB 3.0 connector of the other USB device.

6. The optical USB device of claim 1, wherein one of the third pair of pins is configured to transmit a data signal and the other of the third pair of pins is configured to transmit a clock signal.

7. The optical USB device of claim 1, wherein the non-USB serial bus interface protocol comprises a System Management Bus (SMBUS) protocol.

8. The optical USB device of claim 1, further comprising:
   circuit elements, coupled to the third pair of pins of the USB 3.0 pin-compatible connector configured to provide voltage levels on the third pair of pins to enable the other USB device to detect that the optical USB device is connected to the USB 3.0 connector rather than a conventional USB 3.0 device.

9. The optical USB device of claim 8, wherein the circuit elements comprises pull-up resistors configured to provide a voltage level above a predetermined voltage on each of the third pair of pins for at least a specified time period.

10. A method for operating an optical universal serial bus (USB) device, the method comprising:
    receiving optical signals from an optical fiber and converting the first optical signals into first electrical signals;
    receiving second electrical signals and to converting the second electrical signals into optical signals for transmission to the optical fiber;
    transmitting the first electrical signals to another USB device on a first pair of pins of a USB 3.0 pin-compatible connector of the optical USB device;
    wherein the USB 3.0 pin-compatible connector is configured for coupling to a USB 3.0 connector of the other USB device;
    receiving the second electrical signals from the other USB device on a second pair of pins of the USB 3.0 pin-compatible connector; and
    transceiving third electrical signals according to a non-USB serial bus interface protocol to control and configure the optical USB device on a third pair of pins of the USB 3.0 pin-compatible connector.

11. The method of claim 10, further comprising:
    amplifying electrical signals received from a photo-detect diode to generate the first electrical signals; and
    driving a laser diode in response to the second electrical signals.

12. The method of claim 11, further comprising:
    controlling said amplifying and driving in response to the third electrical signals according to the non-USB serial bus interface protocol.

13. The method of claim 10, wherein the first pair of pins are configured for coupling to the SSRX+ and SSRX− pins of the USB 3.0 connector of the other USB device, wherein the second pair of pins are configured for coupling to the SSTX+ and SSTX− pins of the USB 3.0 connector of the other USB device, wherein the third pair of pins are configured for coupling to the D+ and D− pins of the USB 3.0 connector of the other USB device.

14. The method of claim 10, wherein one of the third pair of pins is configured to transmit a data signal and the other of the third pair of pins is configured to transmit a clock signal.

15. The method of claim 10, wherein the non-USB serial bus interface protocol comprises a System Management Bus (SMBUS) protocol.

16. The method of claim 10, further comprising:
providing voltage levels on the third pair of pins of the USB 3.0 pin-compatible connector upon connection of the optical USB device to the other USB device to enable the other USB device to detect that the optical USB device is connected to the USB 3.0 connector rather than a conventional USB 3.0 device.

17. The method of claim 16, wherein said providing voltage levels on the third pair of pins of the USB 3.0 pin-compatible connector upon connection of the optical USB device to the other USB device to enable the other USB device to detect that the optical USB device is connected to the USB 3.0 connector rather than a conventional USB 3.0 device comprises providing a voltage level above a predetermined voltage on each of the third pair of pins for at least a specified time period.

18. A non-transitory computer readable medium comprising: computer readable program code embodied in said medium, for specifying an comprising:
computer readable program code embodied in said medium, for specifying an optical universal serial bus (USB) device, the computer readable program code comprising:
first program code for specifying an electro-optical converter, configured to receive optical signals from an optical fiber and to convert the first optical signals into first electrical signals, and configured to receive second electrical signals and to convert the second electrical signals into optical signals for transmission to the optical fiber; and
second program code for specifying a USB 3.0 pin-compatible connector, coupled to the electro-optical converter, wherein the USB 3.0 pin-compatible connector is configured for coupling to a USB 3.0 connector of another USB device, the USB 3.0 pin-compatible connector comprising:
a first pair of pins configured for transmitting the first electrical signals from the optical USB device;
a second pair of pins configured for receiving the second electrical signals into the optical USB device; and
a third pair of pins configured for transceiving third electrical signals according to a non-USB serial bus interface protocol to control and configure the electro-optical converter.

19. The non-transitory computer readable medium of claim 18, wherein the at least one computer readable medium is selected from the set of a disk, tape, or other magnetic, optical, or electronic storage medium and a network, wire line, wireless or other communications medium.

20. The non-transitory computer readable medium of claim 18, wherein the first pair of pins are configured for coupling to the SSRX+ and SSRX− pins of the USB 3.0 connector of the other USB device, wherein the second pair of pins are configured for coupling to the SSTX+ and SSTX− pins of the USB 3.0 connector of the other USB device, wherein the third pair of pins are configured for coupling to the D+ and D− pins of the USB 3.0 connector of the other USB device.

* * * * *